United States Patent
Beringer et al.

(10) Patent No.: US 9,367,824 B2
(45) Date of Patent: Jun. 14, 2016

(54) PROVISIONING AND PERFORMING ACTION ITEMS

(75) Inventors: Joerg Beringer, Los Altos, CA (US); Prasad Bhamidipati, Santa Clara, CA (US); Frederic Samson, Palo Alto, CA (US); Murray Spork, San Francisco, CA (US)

(73) Assignee: SAP SE, Walldorf (DE)

( * ) Notice: Subject to any disclaimer, the term of this patent is extended or adjusted under 35 U.S.C. 154(b) by 820 days.

(21) Appl. No.: 13/176,575

(22) Filed: Jul. 5, 2011

(65) Prior Publication Data

US 2013/0014026 A1 Jan. 10, 2013

(51) Int. Cl.
*G06Q 10/06* (2012.01)

(52) U.S. Cl.
CPC .................. *G06Q 10/06311* (2013.01)

(58) Field of Classification Search
CPC . G06Q 10/10; G06Q 30/02; G06Q 10/06375; G06Q 10/109; G06Q 30/0201; G06Q 10/0639; G06Q 30/0282; G06Q 10/06; G06Q 10/00; G06Q 10/063114; G06Q 10/0633; G06Q 10/103; G06F 19/3481
USPC ........................................................ 715/753
See application file for complete search history.

(56) References Cited

U.S. PATENT DOCUMENTS

| | | | | |
|---|---|---|---|---|
| 6,026,410 A * | 2/2000 | Allen et al. | .................... | 704/270 |
| 6,938,069 B1 * | 8/2005 | Narayanaswamy | .......... | 709/204 |
| 7,571,108 B1 * | 8/2009 | Leban | ........................... | 705/7.26 |
| 7,840,509 B1 * | 11/2010 | Messina | .......................... | 706/45 |
| 8,762,874 B2 * | 6/2014 | Hong | .......................... | 715/771 |
| 2006/0026193 A1 * | 2/2006 | Hood | ........................... | 707/102 |
| 2008/0091496 A1 * | 4/2008 | Gurpinar et al. | .................. | 705/8 |

* cited by examiner

*Primary Examiner* — Jennifer To
*Assistant Examiner* — Joseph R Burwell
(74) *Attorney, Agent, or Firm* — Mintz Levin Cohn Ferris Glovsky and Popeo, P.C.

(57) ABSTRACT

An action item specifying one or more tasks is instantiated. Thereafter, data characterizing the action item is associated with at least one tool to perform at least one task. Each tool comprises at least one service, application or procedure to facilitate or perform the at least one task. Subsequently, the at least one tool is initiated. User-generated input and/or other data is received from the at least one tool. Performance of one or more of the tasks specified by the action item is then finalized using the at least one tool and the user-generated input and/or other data. In some variations, the action item can be provisioned with at least one contextual resource to facilitate performance of at least one task. The at least one contextual resource can be associated with the action item and/or at least one user associated with the action item.

19 Claims, 5 Drawing Sheets

| Menu « | Top 7 | MIDDLE 7 | BOTTOM 7 | Practice ▼ | | | Sort by Last updated ▼ |
|---|---|---|---|---|---|---|---|

Inbox
From Notes
Saved Feeds
Assigned tasks
Activities

All types 3
To-Dos 2
Opportunities 1
Leads
Biz Developments
Trips
Meetings
By Due dates
Today ★
Next
Scheduled
Someday
Waiting on
Done

By Customers
PG&E
Green Energy
Kraft
Double Leaf
Company A

+ Add ▼

[Opportunity] Food Inc. Deal — 212
Report to Pipeline | Top 7      Due Yesterday ☐ Dinner with Jim in preferred restaurant — 230
   Open Table Reservation  Zadin Fine Vietnamese  5/11/2010 7pm
   Define  Provision  Share — 236

☐ Meet with technical specialists — 238                    — 214
   WebEx Meeting Touch base on the tech requirements 5/1/2010 3 pm to 4 pm
   Define  Provision  Share ②  — 244

☐ Work with the vendors on the proposal on Kraft deal — 252  — 216
   Define  Provision ③ Share ④  Linked to [S] Let's work on Kraft proposal

410

2008 Sales       2009                  Peter Yang
Report           Enterprise...          Sr. Engineers of
Source: SAP      Source: SAP            ACME
                 CRM
Oracle Product   Untitled               Sales Analysis
Release          Dataset.crl            Report
Source: Web      Source: Web            Source: SAP CRM Untitled
dataset.crl
Source: Web Untitled
dataset.crl
Source: Web ( Frequent To-Dos on LEADS (7) ) ( Collection (10 items) ) ( My TEAM (12 people) )
           224                          226                    228

PROVISIONING AND PERFORMING ACTION ITEMS

TECHNICAL FIELD

The subject matter described herein relates to techniques for provisioning and performing action items and related graphical user interfaces.

BACKGROUND

Personal productivity software is being increasingly adopted by companies and individuals. Such software can allow a user to define task items (i.e., tasks requiring completion, etc.) and track and monitor their progress of completion. Multiple task items for an individual can form part of a single task list. While these types of lists are useful in monitoring the progress of completion of tasks, the related productivity software typically does not assist the user in actually performing such tasks. Task lists typically provide ways to define timelines and tasks ownerships, but they do not point the user to the appropriate software application or recommend methods of approaching the task. During task execution, the task list is not linked with the actual activities related to this task and its use is limited to manage only the completion state of a task instead of acting on the task itself and coordinating timelines and task ownership. As a result, task item and the actual task execution of a task typically stay disconnected and do not form a unified user experience. Stated differently, users maintain their task lists with respect to status and timelines, but use other software applications and collaboration services to accomplish their tasks.

SUMMARY

In one aspect, an action item specifying one or more tasks is instantiated. Thereafter, data characterizing the action item is associated with at least one tool to perform at least one task. Each tool comprises at least one service, application or procedure to facilitate or perform the at least one task. Subsequently, the at least one tool is initiated. Performance of one or more of the tasks specified by the action item is then finalized using the at least one tool. In some variations, the action item can be provisioned with at least one contextual resource to facilitate performance of at least one task. The at least one contextual resource can be associated with the action item and/or at least one user associated with the action item.

In some variations, user-generated input can be received from the at least one tool by one or more users associated with the action item and such user-generated input can be used to facilitate performance of at least one task. This user-generated input can be action parameters specified via, for example, an embedded user interface. In addition, in some variations, the action item can be shared with one or more users to give them access to the same tool or service.

The action item can be associated with at least one tool in a variety of manners. For example, the association can be based on system-supported association using text extraction, an explicit selection from a tool catalog, and/or or from a catalogue recommending methods and procedures in the form of multiple actions. Associating can be a look up and selection followed by a subsequent binding (e.g., connecting the service against the action item and the task context, etc.).

The at least one contextual resource can be any resource that might useful for performing a task including, for example, objects, documents, and participants. The at least one contextual resource can be associated based on pre-defined preferences or historical action items of at least one user associated with the action item.

The at least one tool can be or include at least one collaboration service selected from a group comprising: a collaborative workspace, a web conference, a teleconference, a video conference, and an online document sharing service.

The action item can include a textual description and the action item can be associated with the at least one tool based on the textual description. Instantiating the action item can comprise receiving a text description, parsing the text description to identify an intent for the action item, identifying an action item type based on the parsing, and instantiating the action item according to the identified action item type. Such an arrangement is advantageous in that the action item can be quickly identified and instantiated based, for example on user intent (e.g., "dinner meeting" initiates an action item including a restaurant reservation service tool, etc.).

Data characterizing performance of the action item can be transmitted, persisted, and/or displayed (within a single computing system or across several computing systems).

Instantiation of an action item can be initiated in a variety of manners. For example, user-generated input can be received via a graphical user interface that drags an object into an action item list.

The at least one tool can be encapsulated in a unified interface as well as the action item itself. At least a portion of the action item can be performed in the unified interface and data characterizing performance of the action item can be displayed in the unified interface. The unified interface can include a conversation panel displaying communications between two or more users pertaining to the action item. The unified interface can include a task drawer graphical user interface element which, when activated, displays data characterizing a plurality of previously defined tasks and at least one of the displayed previously defined tasks is used to define the action item. The unified interface can include a collection graphical user interface element which, when activated, displays a collection of contextual resources and at least one of the displayed contextual resources is provided to at least one of the tasks. The unified interface can include a team graphical user interface element which, when activated, displays a plurality of entities and at least one of the displayed plurality of entities participates in the performance of at least one of the tasks. Such entities can be individuals or groups of individuals.

An intended task type can be determined based on the textual description of an action item. In such cases, a task template can be presented in a graphical user interface that corresponds to the intended task type having one or more fields to be completed by a user. The determination of the intended task type can use a task extraction algorithm. The presentation of the task template can comprises polling a contextual resource repository to obtain data characterizing at least one contextual resource associated with the intended task type. The task template can include at least one pre-defined entity to participate with the performance of a corresponding task. The task template can specify at least one contextual resource used for the performance of a corresponding task.

In another aspect, user-generated input specifying a short text description of an action item is received. The short text description is parsed using a text extraction algorithm to identify a corresponding action item type. Thereafter, a template associated with the identified corresponding action item type is displayed. The template lists at least one tool and one contextual resource to be used for the performance of the action item. User-generated input is then received selecting one or more of the at least one tool and the at least one contextual resource. Based on this user-generated input, an action item to be performed using the selected one or more of the at least one tool and the at least one contextual resource is generated.

An intent for the action item can be determined in order to identify the corresponding action item type. In addition, a context for the action item can determined to identify the listed at least one tool and/or at least one contextual resource.

In still a further aspect, an action item specifying one or more tasks is instantiated. Subsequently, data characterizing the action item is associated with at least one tool to perform at least one task (with each tool comprising at least one service, application or procedure to facilitate or perform the at least one task). The at least one tool is then initiated and data is received from the tool that relates to the action item. Performance of the one or more tasks specified by the action item is then finalized using the at least one tool and the received data.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. The methods described herein can be implemented by one or more data processors within a single computing system or distributed amongst two or more computing systems.

The subject matter described herein provides many advantages. For example, action items can be augmented with contextual information other than supporting conventional task parameters such as due date and priority. In addition, action items can be augmented by allowing the user to utilize contextual resources needed to accomplish a task. Such contextual information can also be used in connection with the completion of the action items (as opposed to simply monitoring their rate of completion). In particular, the current subject matter provides an enhanced user experience for task management by linking an action item with the actual process context generated by the system or the user while preparing or executing a task. With the support of the current subject matter, a user can build an entire process context around an action item wholly within an action item list (as opposed to separately initiating services, software, etc.)—which forms a single user interface. Furthermore, the current subject matter is advantageous in that the system and techniques are activity aware and recommend content and practices based on recognized intent and available context.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a second graphical user interface rendering an action item list showing embedded collaboration with multiple contributors;

FIG. 4 is a third graphical user interface rendering an action item list showing the enrichment of a task item with related resources.

Like reference symbols in the various drawings indicate like elements.

DETAILED DESCRIPTION

Figure 1:
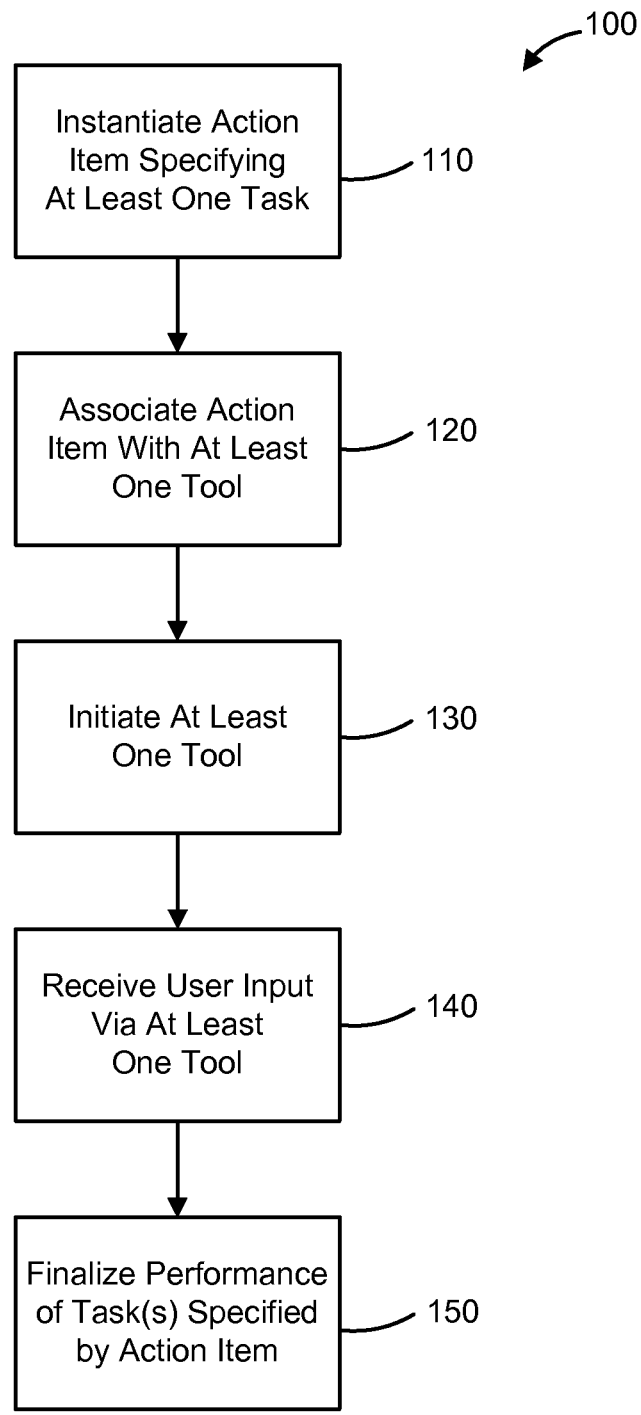
FIG. 1 is a process flow diagram illustrating aspects of a method having one or more features consistent with implementations of the current subject matter.

FIG. 1 is a process flow diagram illustrating a method 100, in which, at 110, an action item specifying one or more tasks is instantiated. Data characterizing the action item is then associated, at 120, with at least one tool to perform at least one task. Each tool comprises at least one service, application or procedure to facilitate or perform the at least one task. Subsequently, at 130, the at least one tool is instantiated. Optionally, user-generated input can be received, at 140, via the at least one tool (e.g., through an embedded user interface, etc.) by one or more users associated with the action item. Thereafter, at 150, performance of the one or more tasks specified by the action item is finalized using the at least one tool and, if applicable, the user-generated input.

The current subject matter provides systems and techniques for the transition of one single action item into the actual instantiation and navigation to the execution context of such item. As used herein, an "action item" refers to at least one task that needs to be performed. In some cases, there are multiple related tasks (e.g., take prospect to dinner→prepare proposal for prospect→arrange meeting to present proposal, etc.). Tasks can be comprised of multiple activities. Stated differently, completion of each task can require completion of one or more activities (e.g., make dinner reservation, attend dinner with prospect, etc.). One example of decomposing a task into multiple activities is described in U.S. patent application Ser. No. 10/657,748 entitled "Guided Procedure Framework", the contents of which are hereby incorporated by reference. As described further below, the implementation of an action item list can be accomplished in a semi-automated manner in which action items are provisioned with contextual resources while the system infers user intent from available context.

When an action item is instantiated (e.g., created, initiated, etc.) based, for example, on a short text description, the related input data can be parsed so that a best matching intent can be determined (using, for example, a text extraction algorithm, a wizard interface, and the like). The recognized intent can be represented, for example, in the form of a location in a verb/noun semantic space. The parameters of the action item can include user-specified parameters, default parameters, or a combination of both. User-specified parameters can be elicited in a variety of manners including a wizard interface that includes a series of interrogatories which can be used to define the action item. For example, the wizard could first elicit the type of action item, followed by the participants, followed by the tasks for such participants, followed by a listing of relevant software tools/services and the like. As used herein, the term "tool" can refer to the services that enact the action item/or tasks forming part of the action item. Stated differently, a tool is a purposed application that can be used as a "tool" to perform a task or activity. In addition, as described further below, contextual resources can be optionally provisioned to further facilitate performance of the action item/tasks.

In some implementations, the action item is instantiated based on a selection of a resource. For example, a user may have a series of documents/resources/participants in his or her action item interface (based on a wide variety of factors ranging from historical action items to company employee hierarchy/section, etc.). A user may drag and drop one such resource into an action item list which causes an action item to be instantiated having a type corresponding to the "dropped" resource.

A contextual resource repository can be searched for matching tools and/or contextual resources that are annotated based on the same schema or have an association with the recognized task context. One example of a contextual resource repository and access of same is described in U.S. patent application Ser. No. 11/048,703 entitled "Context Modeler and Method for Modeling a Context Representation", the contents of which are hereby incorporated by reference. As used herein, contextual resources refer to any information/objects/participants which can be used by users and/or tools in the performance of a task (contextual resources differ from tools). For example, if the action item is "Review Pipeline", a data explorer tool can be initiated to allow a user to review current data. Or alternatively, a CRM tool can be initiated to browse all opportunities. Lastly, as a further example, the system can initiate a conference call tool with a sales team in order to discuss the deal portfolio. If the action item relates to a meeting, conference call provider information (a contextual resource) can be displayed in a graphical user interface (which the user can select as part of the action item definition) and/or one or more services (tools) can be initiated that provide conferencing capabilities.

A list of contextual resources can be provided (e.g., a palette, etc.) for a user when defining and/or performing an action item. In some cases, the contextual resources provided and/or presented to a user can dynamically change based on the context of other information used to define the action item and/or historical patterns of the user or users having similar roles/responsibilities, etc. For example, after the user defines an action item and with related contextual resources, subsequent action items being defined by the user that are similar in nature can use the earlier specified contextual resources/services. In some cases, the user can define an association to ensure that a particular type of action item is associated with a tool and/or contextual resource.

Independent of the system recommendation algorithm (i.e., the algorithm to define which tools and/or contextual resources to use or present for a particular action item, etc.), the user interface allows for the user to assemble relevant contextual resources to execute an action item. These resources can comprise, for example, a template for an artifact to be created (e.g., create quote, etc.), a business entity which is the primary object of use in the action item (e.g., review account, etc.), and/or supporting information which can facilitate any required decision making or planning (e.g., push end of quarter deals, etc.).

With the current subject matter, the user can also decide about the general approach on how to perform an action item. The user can, for example, create collaborative workspaces, setup shared documents, and take other collaborative actions to provision the activities specified by the action item with the necessary environment. As one example, when deciding on which deals to push at the end of a quarter, a user can provide a report of pending deals as input and setup a decision making activity to select the top five deals the team should focus on for the remainder of the quarter. This can be accomplished by having the user invite participants (e.g., the sales team, etc.) and set up a decision making space to share content (and optionally use other contextual resources to drive a decision to be made).

The current action-item lists also offer in-place support for light-weight collaboration scenarios in which a user wants to discuss an action item or related content item/tool. For example, the user can start with creating a note "Need to send product info to customer XYZ". The system can recognize product info as the "noun" and associate content (the standard product information) and/or verbs (create, assemble, request, review document, etc.). Once the product information has been assembled and tailored for customer XYZ, the user can share the action item with additional reviewers and discuss the shared artifact.

In some cases, the contextual resources to be provided/utilized is not clear given the text of the action item. For example, "Convince customer to buy a multi-user license". "Convince" can be characterized as an abstract verb that requires more specification and decision about the approach about how to convince the customer. In this case, the system can offer a variety of related practices, including a meta conversation about finding the correct approach. This meta conversation can, for example, take the form of a series of interrogatories (e.g., wizard sequence, etc.) in order to assist the user in finding the correct contextual resources to specify and/or perform the action item. In a similar manner, the system can infer the general action type (e.g., planning, deciding, reviewing, event organizing, etc.) and develop an understanding of the type of business task to facilitate not only provisioning of an action item, but to recommend potential pre- and post-activities.

When an action item is fully provisioned either by the user or the system, the action item can become stateful by storing a collection of work artifacts and by linking to tools or a workspace. The user can be automatically connected to activities that have been spawned and receive activity feeds and status updates. Certain event types can be used to infer the progress or completion of an action item. For example, the upload of an artifact, or the decision making in a decision making workspace, can represent a certain milestone in a specific task.

In some implementations, the system can learn idiosyncratic terms to improve intent recognition and/or learn preferences with regard to usages of templates and contextual resources related to the recognized intent. The intent recognition can use, for example, predictive modeling techniques (which can be specific to a particular user and/or applicable to all users) for such intent recognition/learning. In some cases, the predictive model is trained based on intent/preference data obtained from a large population of users across numerous types of action items. Intent can alternatively or additionally be based on historical action items performed by the user. For example, an action item type can be based on most frequently action item categories and the contextual resources to perform corresponding tasks can also be based on a user's history.

Figure 2:
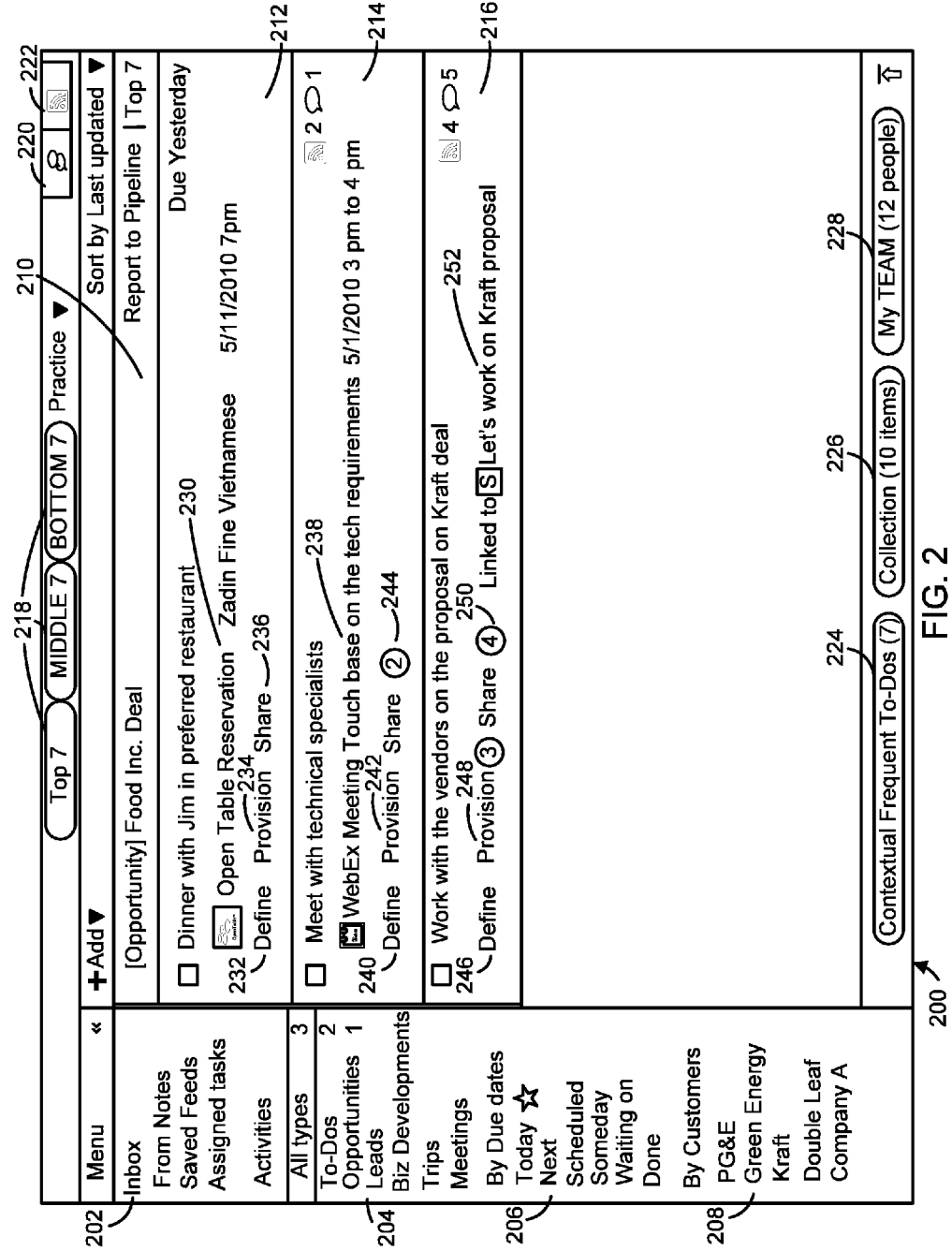
FIG. 2 is a first graphical user interface rendering an action item list.

FIG. 2 is a diagram illustrating a graphical user interface 200 rendering an action item list. While this interface 200 provides a specific arrangement of a plurality of elements 202-252, it will be appreciated that other arrangements can be provided with some or all of the elements 202-252 and/or some of such elements 202-252 can be omitted. In a left column, an inbox element 202 can be selected to cause one or more action items to be displayed. Filtering options for the inbox element can limit the action items to those originating from notes, from saved feeds, and/or assigned tasks and the like. In some implementations, the action items can be categorized into different types. With such an arrangement, an activities element 204 can be provided that, when activated, causes certain types of action items to be displayed (e.g., all types, to-dos, opportunities, leads, biz developments, trips, meetings, etc.). Further filtering of action items can be performed by activating a due date element 206 (e.g., filtering can be performed over certain time periods, whether there is a task within the action item that requires completion by a third party or entity, and whether the action item has been completed, etc.). Action items to be displayed can also be filtered by activating a customer element 208 (which in turn filters action items based on a particular customer, etc.).

In a middle portion of the interface 200, a single action item 210 is displayed that relates to a potential deal with a customer. The action item contains three tasks 212, 214, 216, each requiring more one or more activities in order for the entire action element 210 to be completed. When the action item 210 was initiated, the first task 212 was to have a dinner meeting. During the definition of the action item 210, the task 212 was identified as including a dinner meeting which in turn caused a service to be initiated to make a dinner reservation (e.g., the OPEN TABLE meal reservation platform). Clicking on a reservation element 230 causes additional information about the dinner reservation to be displayed (e.g., location of restaurant, overview of cuisine, confirmation code, etc.).

The second task 214 pertains to a meeting with technical specialists. When the second task 214 was first defined, it was determined that a web-conferencing platform (e.g., the WEBEX platform, etc.) would be required for the meeting and so a corresponding service was initiated to establish the particulars (e.g., participants, telephone/URL codes, documents, billing information, etc.) for the web-conferencing platform.

The third task 216 pertains to a to-do item with regard to working with vendors for the proposed deal. Unlike the first and second tasks 212, 214, the third task 216 does not include an encapsulated service (e.g., dinner reservation service, web-conferencing service, etc.). However, the third task 216 includes a link element 252 which shows that the third task 216 is linked to a general collaboration environment.

Figure 3:
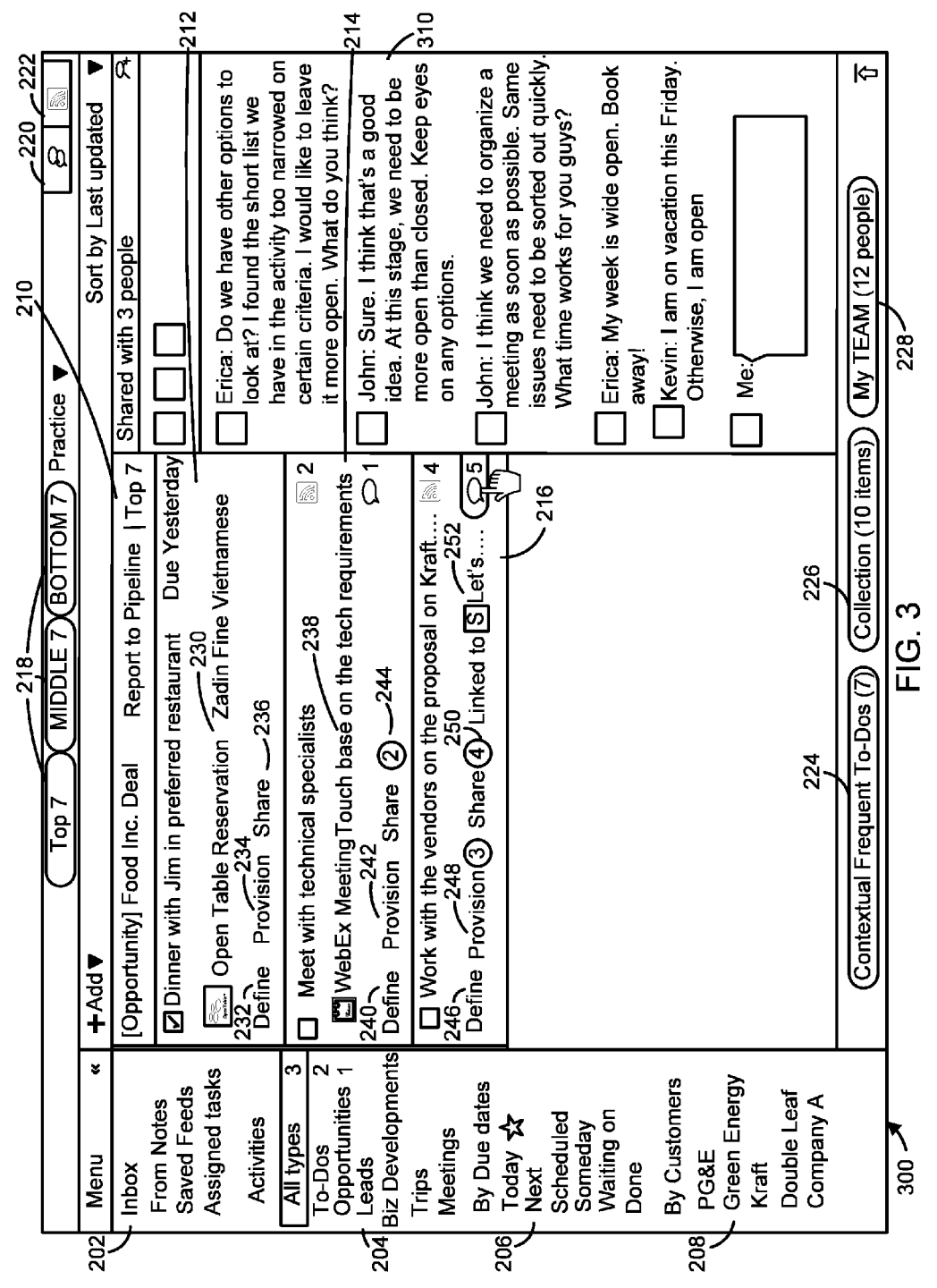

A conversation button 220 can be provided, which when activated, can show conversations pertaining to the tasks 212-216. These conversations can be rendered in a column adjacent to the tasks 212-216 (as show in the conversations panel 310 in the interface 300 of FIG. 3) and/or below the tasks 212-216. The second task 214 includes a conversation indicator showing that one conversation exists for the second task 214 and the third task 216 includes a conversation indicator showing that five conversations exist for the third task 216. Activating these indicators can also result in additional information regarding corresponding conversations to be rendered in the interface 200.

An update button 222 can be provided which, when activated, can show recent updates have been made to the tasks 212-216. These updates can be rendered in a column adjacent to the tasks 212-216 and/or below the tasks 212-216. The second task 214 includes an update indication showing that two updates have been recently made and the third task 216 includes an update indication showing that four updates have been made. Activating these indicators can also result in additional information regarding corresponding updates to be rendered in the interface 200.

Sorting buttons 218 can be provided to characterize action items into groups having differing levels of importance (e.g., top 7, middle 7, bottom 7, etc.). Such different levels can be used in order to allow the user to focus on those action items/tasks having the greatest importance. Task items or activities can, in some cases, be tagged (casted) to represent some aspect of the action item (e.g., a CRM deal which can then be used to drive a sales method, etc.). Activation of a sorting button can cause at least a portion of the corresponding action elements to be rendered in the interface 200.

In addition, each of the tasks 212, 214, 216 can each contain a define element 232, 240, 246, a provision element 234, 242, 248, and a share element 236, 244, 252. The define elements 232, 240, 246, when activated, can cause the corresponding task 212-216 to be modified or otherwise changed. The provision elements 234, 242, 248, when activated, can cause the task 234, 242, 248 to be provided with required resources. Lastly, the share elements 236, 244, 252, when activated, can cause the corresponding task 212-216 (or data characterizing same) to be shared with another user.

Figure 5:
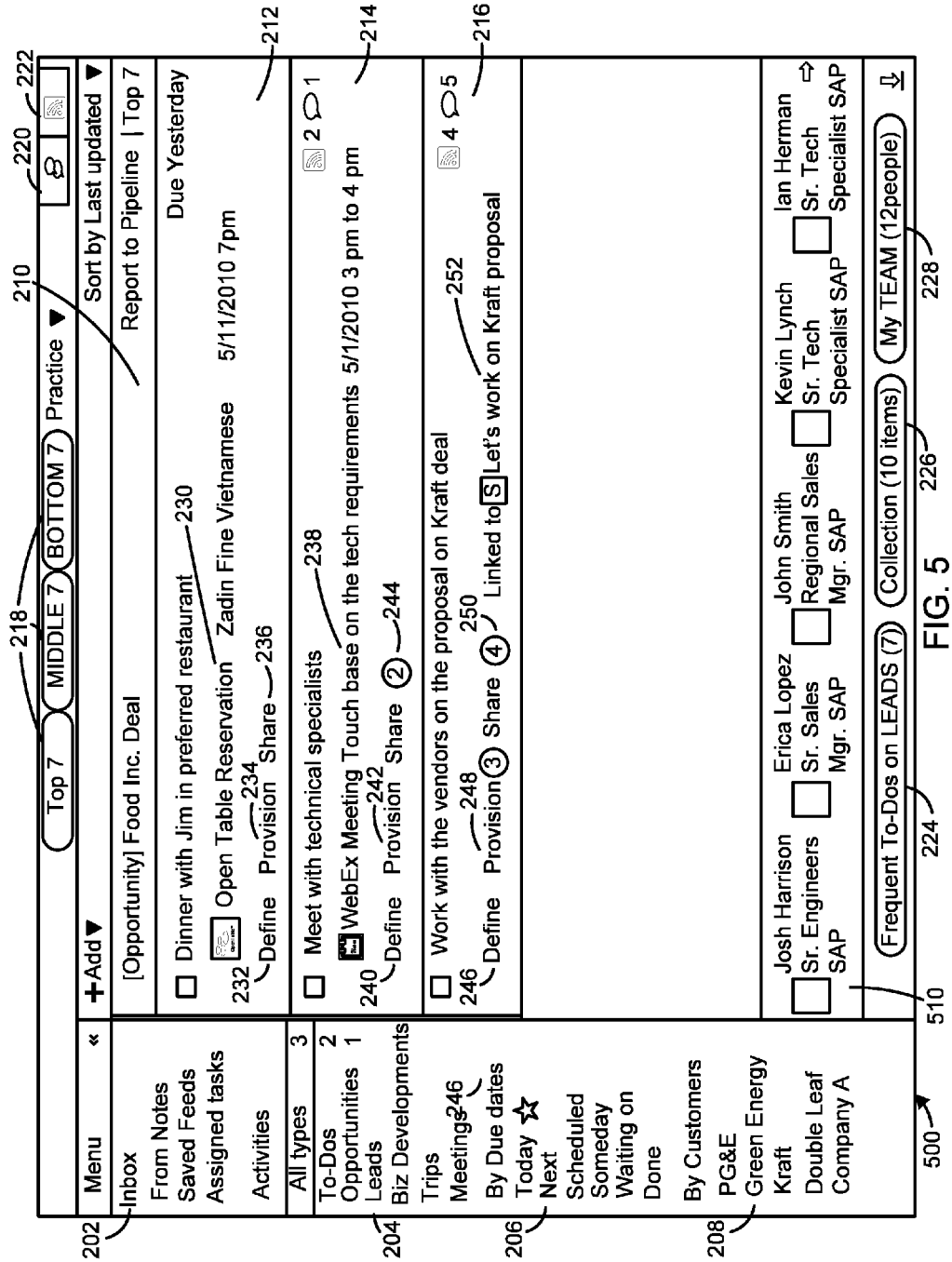
FIG. 5 is a fourth graphical user interface rendering an action item list showing the enrichment of a task context by adding contributors.

Additional drawer elements can be provided in a lower part of the graphical user interface 200. These drawer elements can be used to accelerate the performance of an action item. With the drawer elements, a user can quickly re-use a previous activity context or template and/or they can select an action item (e.g., quotation template, etc.) and the system can instantiate the corresponding task context based on practices and preferences (such as practice and preferences to create a quote). For example, a contextual frequent to-dos drawer 224, when activated, can cause frequent action items and/or tasks to be displayed. A collection drawer 226, when activated, can cause documents (or data characterizing same) to be displayed in the interface 200. These documents can be user specific, action item specific, and/or task specific. The interface 400 of FIG. 4 illustrates a collection of documents 410 (which can individually be activated to provide further information from same, etc.). As used in this context, the collection of documents 410 can comprise data characterizing a set of electronic documents, individuals, companies, tools, and/or practices which the user has accumulated over time. A my team drawer 228, when activated, can cause information characterizing a group of individuals or other entities associated with the user to be displayed. The interface 500 of FIG. 5 illustrates a set of people 510 that the user has identified as being important in connection with action items and/or tasks.

The following provides a sample use-case scenario using graphical user interface 200. A user met an individual named Jim Smith at a company convention and sees potential opportunity with this person. As a result, he opens up activities via the activities element 204. The user then creates a new to-do to remind himself to make a dinner appointment with Jim. By activating a define element 232 corresponding to the to-do just generated, the first task 212 can be defined. Tools can be displayed to the user as part of the definition process. For example, a drop down menu can be used to list several dinner reservation services which can be used to make a reservation at a suitable restaurant. Other tools can be utilized (however in this case the dinner reservation tools were displayed because of the inclusion of the word "dinner" in the to-do). The user then selects the OPEN TABLE dinner reservation service 230 which causes a reservation form to be rendered by which the user can specify which restaurant, data, time, and size of party. In this case, the user selects Zadin Fine Vietnamese which causes such information to be displayed in first task 212. After the dinner, the user can additionally flag the first task 212 to characterize the interaction with Jim (e.g., opportunity, lead, business development, etc.). This characterization can be also used by a CRM system for tracking purposes and applying sales methods. In this case, the action item is characterized by the user as an opportunity. The action item 210 is further defined by the user (via, for example, one or more forms to include information such as contact information, owners, type of item, amount of deal, status information, and the like. Other participants in connection with the action item 210 can also be notified (and any updates can be automatically published to them).

The user then define further to-dos, which at a high level (prior to definition) comprise meet with customers (which corresponds to task 214) and work with vendors on proposal (which corresponds to task 216). The user later defines the to-do meet with customers to result in the second task 214 and defines the to-do work with vendors on proposal into the third task 216 (using, for example, one or more forms and encapsulated tools/service, etc.). The user when defining the second task 214 activates the provision element 242 and opens the collection drawer 410 in order to provision the second task 214 with a sales report illustrated in the collection drawer 410. In addition, the user also opens the "my team" drawer 510 to add people to the third task 216. The participants involved with the tasks 212-216 communicate with each other (via various modalities including e-mail and messaging, etc.) and such conversations are saved and can be later accessed via the conversations panel 310.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors comprising:
   generating a graphical user interface that comprises a series of sequential interrogatories to be used in defining an action item, the defining of the action item using the series of sequential interrogatories comprising:
      accessing the result of a first interrogatory to determine a type of the action item;
      accessing the result of a second interrogatory to determine a group of participants for the action item;
      accessing the result of a third interrogatory to determine at least one specified task for at least one of the group of participants;
      accessing the result of a fourth interrogatory to determine a selection of relevant tools for the action item; and
      defining the action item as encapsulating the determinations of the type, the group of participants, the at least one specified task, and the selection of relevant tools for the action item;
   instantiating, by at least one data processor, the action item specifying one or more tasks;
   associating, by at least one data processor, data characterizing the action item with at least one tool to perform at least one task, each tool comprising at least one service, application or procedure to facilitate or perform the at least one task, the associating comprising: using a predictive model to determine which at least one service, application, or procedure to associate with the action item, the predictive model being trained based on intent and preference data obtained from a population of users across a plurality of types of action items;
   initiating, by at least one data processor, the at least one tool;
   receiving, by at least one data processor, user-generated input, via the at least one tool, by one or more users associated with the action item; and
   finalizing, by at least one data processor, performance of the one or more tasks specified by the action item using the at least one tool and the user-generated input.

2. A method as in claim 1, further comprising:
   provisioning, by at least one data processor, the action item with at least one contextual resource to facilitate performance of at least one task, the at least one contextual resource being associated with the action item and/or at least one user associated with the action item.

3. A method as in claim 2, wherein the at least one contextual resource is selected from a group comprising: objects, documents, and participants.

4. A method as in claim 2, wherein the at least one contextual resource is further associated based on pre-defined preferences or historical action items of at least one user associated with the action item.

5. A method as in claim 1, wherein the at least one tool comprises at least one collaboration service selected from a group comprising: a collaborative workspace, a web conference, a teleconference, a video conference, and an online document sharing service.

6. A method as in claim 1, wherein the action item includes a textual description and the action item is associated with the at least one tool based on the textual description.

7. A method as in claim 6, further comprising:
determining, by at least one data processor, an intended task type based on the textual description; and
presenting, by at least one data processor via a graphical user interface, a task template corresponding to the intended task type having one or more fields to be completed by a user.

8. A method as in claim 7, wherein the presentation of the task template comprises: polling, by at least one data processor, a contextual resource repository to obtain data characterizing at least one contextual resource associated with the intended task type.

9. A method as in claim 7, wherein the task template specifies at least one pre-defined entity to participate with the performance of a corresponding task and/or at least one contextual resource used for the performance of a corresponding task.

10. A method as in claim 1, wherein instantiating the action item comprises:
receiving, by at least one data processor, a text description;
parsing, by at least one data processor, the text description to identify an intent for the action item;
identifying, by at least one data processor, an action item type based on the parsing; and
instantiating, by at least one data processor, the action item according to the identified action item type.

11. A method as in claim 1, further comprising at least one of: transmitting data characterizing performance of the action item, persisting data characterizing performance of the action item, and displaying data characterizing performance of the action item.

12. A method as in claim 1, further comprising:
receiving, by at least one data processor, user-generated input, via a graphical user interface, dragging an object into an action item list;
wherein the action item is instantiated in response to the dragging of the object and is selected based on the object.

13. A method as in claim 1, further comprising:
encapsulating, by at least one data processor, the at least one tool within a unified interface;
wherein the action item is instantiated in the unified interface, at least a portion of the action item is performed in the unified interface, and data characterizing performance of the action item is displayed in the unified interface.

14. A method as in claim 13, wherein the unified interface includes a conversation panel displaying communications between two or more users pertaining to the action item.

15. A method as in claim 13, wherein the unified interface includes a task drawer graphical user interface element, the task drawer graphical user interface element, when activated, displaying data characterizing a plurality of previously defined tasks, at least one of the displayed previously defined tasks being used to define the action item.

16. A method as in claim 13, wherein the unified interface includes a collection graphical user interface element, the collection graphical user interface element, when activated, displaying a collection of contextual resources, at least one of the displayed contextual resources being provided to at least one of the tasks.

17. A method as in claim 13, wherein the unified interface includes a team graphical user interface element, the team graphical user interface element, when activated, displaying a plurality of entities, at least one of the displayed plurality of entities participating in the performance of at least one of the tasks.

18. A method for implementation by one or more data processors comprising:
receiving, by at least one data processor, user-generated input specifying a short text description of an action item;
parsing, by at least one data processor, the short text description, using a text extraction algorithm, to identify a corresponding action item type;
generating a graphical user interface that comprises a series of sequential interrogatories to be used in defining the action item, the defining of the action item using the series of sequential interrogatories comprising:
accessing the result of a first interrogatory to determine a type of the action item;
accessing the result of a second interrogatory to determine a group of participants for the action item;
accessing the result of a third interrogatory to determine at least one specified task for at least one of the group of participants;
accessing the result of a fourth interrogatory to determine a selection of relevant tools for the action item; and
defining the action item as encapsulating the determinations of the type, the group of participants, the at least one specified task, and the selection of relevant tools for the action item;
associating, by at least one data processor, data characterizing the action item with at least one tool to perform at least one task, each tool comprising at least one service, application or procedure to facilitate or perform the at least one task, the associating comprising:
displaying, by at least one data processor, a template associated with the identified corresponding action item type, the template listing at least one tool and one contextual resource to be used for the performance of the action item;
receiving, by at least one data processor, user-generated input selecting one or more of the at least one tool and the at least one contextual resource; and
generating, by at least one data processor, an action item based on the user-generated input, the action item to be performed using the selected one or more of the at least one tool and the at least one contextual resource by:
determining, using at least one predictive model, an intent for the action item used to identify the corresponding action item type; and
determining, based on the determined intent, a context for the action item used to identify the listed at least one tool and at least one contextual resource.

19. A method for implementation by one or more data processors comprising:

generating a graphical user interface that comprises a series of sequential interrogatories to be used in defining an action item, the defining of the action item using the series of sequential interrogatories comprising:
  accessing the result of a first interrogatory to determine a type of the action item;
  accessing the result of a second interrogatory to determine a group of participants for the action item;
  accessing the result of a third interrogatory to determine at least one specified task for at least one of the group of participants;
  accessing the result of a fourth interrogatory to determine a selection of relevant tools for the action item; and
defining the action item as encapsulating the determinations of the type, the group of participants, the at least one specified task, and the selection of relevant tools for the action item;
instantiating, by at least one data processor, the action item specifying one or more tasks;
associating, by at least one data processor, data characterizing the action item with at least one tool to perform at least one task, each tool comprising at least one service, application or procedure to facilitate or perform the at least one task, wherein at least one contextual resource is further associated based on historical action items of at least one user associated with the action item;
initiating, by at least one data processor, the at least one tool;
receiving, by at least one data processor, data from the at least one tool relating to the action item; and
finalizing, by at least one data processor, performance of the one or more tasks specified by the action item using the at least one tool and the received data.

* * * * *